United States Patent [19]

Brasseur

[11] Patent Number: 5,325,490
[45] Date of Patent: Jun. 28, 1994

[54] METHOD AND APPARATUS FOR REPLACEMENT OF AN ORIGINAL MICROPROCESSOR WITH A REPLACEMENT MICROPROCESSOR IN A COMPUTER SYSTEM HAVING A NUMERIC PROCESSOR EXTENSION

[75] Inventor: Jauhn R. Brasseur, Portland, Oreg.

[73] Assignee: Intel Corporation, Santa Clara, Calif.

[21] Appl. No.: 809,575

[22] Filed: Dec. 18, 1991

[51] Int. Cl.⁵ ...................... G06F 13/00; G06F 15/20
[52] U.S. Cl. ................................... 395/325; 364/231; 364/228; 364/268; 364/239.9; 364/DIG. 1
[58] Field of Search ............... 395/275, 325, 375, 575, 395/800; 371/9.1, 11.1, 68.3

[56] References Cited

U.S. PATENT DOCUMENTS

| | | | |
|---|---|---|---|
| 3,811,114 | 5/1974 | Lemay et al. | 364/200 |
| 3,828,321 | 8/1974 | Wilber et al. | 364/200 |
| 3,882,455 | 5/1975 | Heck et al. | 364/200 |
| 3,921,141 | 11/1975 | Wilber et al. | 364/200 |
| 3,956,738 | 5/1976 | Tessera | 364/200 |
| 4,212,078 | 7/1980 | Games et al. | 364/900 |
| 4,456,952 | 6/1984 | Mohrman et al. | 364/200 |
| 4,799,155 | 1/1989 | Wilson et al. | 364/200 |
| 4,975,838 | 12/1990 | Mizuno et al. | 364/200 |
| 5,005,174 | 4/1991 | Bruckert et al. | 371/68.3 |
| 5,093,908 | 3/1992 | Beacom et al. | 395/375 |
| 5,138,708 | 8/1992 | Vosbury | 395/575 |

Primary Examiner—Gopal C. Ray
Attorney, Agent, or Firm—Blakely, Sokoloff, Taylor & Zafman

[57] ABSTRACT

A method and apparatus that provides for the replacement of a first microprocessor with a second microprocessor in a microcomputer system. The method and apparatus allow the second microprocessor to utilize a Numeric Processor Extension (NPX) installed in the microcomputer system. This is accomplished by monitoring control signals, detecting unique error conditions, queuing NPX opcodes and operands when overlap conditions exist, transmitting queued NPX opcodes and operands and translating bus cycles between the microprocessor and the microcomputer system motherboard.

20 Claims, 7 Drawing Sheets

METHOD AND APPARATUS FOR REPLACEMENT OF AN ORIGINAL MICROPROCESSOR WITH A REPLACEMENT MICROPROCESSOR IN A COMPUTER SYSTEM HAVING A NUMERIC PROCESSOR EXTENSION

BACKGROUND OF THE INVENTION

1. Field of the Invention

The present invention relates to the field of microcomputer systems, in particular, this invention relates to the replacement of a microprocessor in a microcomputer system having a processor extension.

2. Description of the Related Art

In microcomputer systems, it is often desirable to increase system performance in order to increase the speed in which tasks are completed. A first known technique for increasing the performance of a microcomputer system is by replacing a microprocessor contained in the microcomputer system with a different microprocessor that provides such increased performance. Replacement of microprocessors is desirable because it is a cost effective in that other components in the microcomputer system are typically retained (e.g. the RAM memory, external disks, etc.). A second known technique for increasing the performance of a microcomputer system is through the use of processor extensions. Processor extensions are special purpose processing components, e.g. a math co-processor, that perform a predefined set of operations at processing speeds significantly greater than that of general purpose microprocessors. Processor extensions receive operation codes and operands from a general purpose microprocessor, perform the desired operation and return the results to the general purpose microprocessor. All of this may occur while the general purpose microprocessor is performing some other task.

Mathematical operations are a common predefined set of operations implemented on a processor extension, and are referred to as a Numeric Processor Extension (NPX). Such NPX devices include the Intel® 80287 and 80287XL Numeric co-processors available from the Intel Corporation of Santa Clara, Calif. The 80287 and 80287XL are designed for use with the Intel 80286 line of general purpose microprocessors. The 80287 and 80287XL differ in that the 80287XL has a greater number of numeric operations it may perform. Otherwise, a computer system design utilizing either device would be identical.

Typically, an NPX is designed to operate closely with a particular microprocessor. Operate closely refers to design aspects of both the microprocessor and the NPX which would facilitate fast communication and coordination between the two components. This would include dedicated I/O ports as well as dedicated handshaking lines on the respective components. In the case of the aforementioned 80287 and 80287XL, the microprocessor that they operate closely with is the Intel 80286.

It is common for different microprocessors to have different methods and techniques for coordinating operations and communicating with an NPX. This occurs because a standard interface does not exist between a microprocessor and NPX. This creates additional requirements for replacing a first microprocessor with a second microprocessor. Typically, in such a replacement, the NPX would also have to be replaced.

Known microprocessor devices are members of "families" of such devices. A microprocessor family, for example the 80286 "family" of microprocessors, contains function and performance characteristics that are substantially similar. Differences lie in chip packaging and/or operational specifications. Other differences include CPU clock rates or the size of the address path. The 80286 family of microprocessors are described as 16-bit microprocessors because they have 16-bit internal architectures and are designed for microcomputer systems with 16-bit wide data paths.

The Intel® 80386 family of microprocessors have 32-bit internal architectures, but individual members may be used with microcomputer systems that have varying sized data paths. A member of the 80386 family that is designed for use in microcomputer systems with 32-bit wide data paths is the 80386DX ™. Alternatively, the 80386SX ™ has a 32-bit internal architecture but is designed to be used with microcomputer systems that have a 16-bit data path. The 80386 family of microprocessors is distinguishable from the 80286 in that the 80386 family has: a greatly increased addressing range; the ability to accommodate operands with a greater number of bits and may perform operations at a greater speed. The Intel 80286 and 80386 family of microprocessors are described in detail in the publication *Microprocessors*, order No. 230843-007 available from the Intel Corporation of Santa Clara, Calif.

Known microcomputer systems that utilize an 80286 or compatible microprocessor and have 16-bit data paths are the IBM PC/AT and PS/2 ®; models 25-286, 50, 50-Z, 60, and 30-286 (hereinafter qualifying PS/2 systems); all available from the IBM Corporation of Armonk, N.Y., or PC/AT or PS/2 compatible systems. Technical specifications concerning the PC/AT and PS/2 system design are available from the IBM Corporation. In the aforementioned microcomputer systems, the use of the 80287 or 80287XL as a numerics processor extension is optional. The user of the microcomputer system would optionally install the 80287 or 80287XL if the application software that they used required or would benefit from it. In such systems, a chip socket is provided for electrical coupling of the processor extension.

Coupling an 80386DXTM ™ a PC/AT or compatible microcomputer system is known in the art. The Intel Corporation offers a product under the name InBoard ™, which provides for the replacement of the 80286 with 80386DX. With the InBoard, an 80386DX is coupled to a Printed Circuit Board (PCB). The PCB contains it's own RAM memory, processor extension socket for an 80387 Numeric Co-processor, and other support circuitry. The InBoard is coupled to the PC/AT microcomputer system through one of a plurality of I/O slots on the PC/AT microcomputer system motherboard. A ribbon cable with an 80286 socket compatible plug, is used to electrically couple the PCB with the 80286 socket. Detailed technical information about the InBoard product is available from the Intel Corporation.

The InBoard design does not make use of processor extensions or all of the RAM memory that currently exist on the PC/AT motherboard. As a result, these components are unneeded. This results in increased costs and wasted assets. The increased costs are in requiring the purchase of new RAM memory and an 80387 NPX. The wasted assets are the unneeded RAM memory and processor extension (i.e. on 80287 or 80287XL).

Coupling an 80386DX to a PC/AT or compatible microcomputer system using the InBoard design requires much support circuitry because of the inherent architectural differences between the 80386DX and the 80286 families. Such difference include the additional addressing and data lines in the 80386DX. Additionally, since the InBoard design requires an I/O slot on the PC/AT system, it's use is limited to systems with an available I/O slot. The InBoard design is further limited in that it cannot be used-in non-PC/AT compatible systems.

Utilizing an 80386DX Microprocessor with an 80287 Numeric co-processor is described in general in the above referenced publication *Microprocessors*. However, it is important to note that the description in the reference is directed to the 80386DX microprocessor and not the 80386SX microprocessor. An important distinction between an 80386DX and and 80386SX is that the 80386DX microprocessor has the ability to recognize the 80287 as an NPX and thus communicate with 80287 in a compatible manner. Further, the interface described in the publication assumes that the microcomputer system is being designed specifically for the 80386DX, i.e. it is not intended to be a design for an interface module to an existing microcomputer system. The reference fails to contemplate utilizing a 80386SX replacing a 80286 in a Microcomputer system with an 80287 installed.

As described above, the 80386SX is designed to operate in microcomputer systems with 16-bit data paths. Thus, in order to gain the benefits of the 80386 family of microprocessors in a currently existing microcomputer system, it would be desirable to replace the 80286 microprocessor in an IBM PC/AT, PS/2 qualifying or compatible microcomputer systems, with an 80386SX. Although the 80286 and the 80386SX can both be utilized on a microcomputer system with 16-bit wide data paths, the two differ in many other respects. These differences include pin configurations, internal cycle times, exception handing, and operation with NPX devices.

It is an object of the present invention to provide for replacement of an 80286 with an 80386SX in a PC/AT, PS/2 qualifying or compatible system when an 80287 or 80287XL has been optionally installed. Further, it is an object of this invention to provide such a method that does not require an I/O slot on the PC/AT or compatible system. The objects of the invention are desirable because it would reduce the consumer cost of obtaining functionality and performance increases of the 80386 line of microprocessors as well as extend the useful life of PC/AT or PS/2 and compatible microcomputer systems.

SUMMARY

A method and apparatus that provides for the replacement of a first microprocessor with a second microprocessor in a microcomputer system, is disclosed. The present invention allows the second microprocessor to utilize a Numeric Processor Extension (NPX) installed in the microcomputer system. The present invention is embodied in an apparatus that plugs into a microprocessor socket located on the motherboard of a microcomputer system. The apparatus is generally comprised of a Printed Circuit Board that contains gate array logic circuitry, a means for coupling the second microprocessor onto the Printed Circuit Board and means for coupling the module into the microprocessor socket. The method of the present invention provides for the handling of operational differences between the first microprocessor and the second microprocessor and includes the steps of detecting an NPX instruction, translating NPX I/O port addresses, converting bus cycles, storing NPX opcodes and operands when overlap conditions exist and transferring the NPX opcodes and operands when the NPX is available.

DESCRIPTION OF THE PREFERRED EMBODIMENT

A method and apparatus for interfacing a general purpose microprocessor to a processor extension, namely a Numeric Processor Extension (or NPX), is described. Such an interface is necessary, for example, when replacing a microprocessor in a microcomputer system. In the following description, numerous specific details are set forth such as pin configurations and signal connections, etc., in order to provide a thorough understanding of the present invention. However, it will be obvious to one skilled in the art that the present invention may be practiced without these specific details. In other instances, well-known functions, e.g. queuing schemes, detecting signal conditions, or translation logic have not been described in detail in order not to unnecessarily obscure the present invention.

The microcomputer system of the preferred embodiment is described with reference to FIG. 1. The present invention may be implemented on a microcomputer system that is designed for use with an Intel ® 80286 Microprocessor (hereinafter the '286) or compatible microprocessor coupled with an Intel 80287, 80287XL or compatible numeric co-processor (hereinafter the '287 NPX). Such microcomputer systems include IBM PC/AT TM personal computer, selected members of the IBM PS/2 TM computer family, available from the IBM corporation of Armonk, N.Y., or alternatively, any IBM PC/AT or '286 based PS/2 compatible systems.

Figure 1:
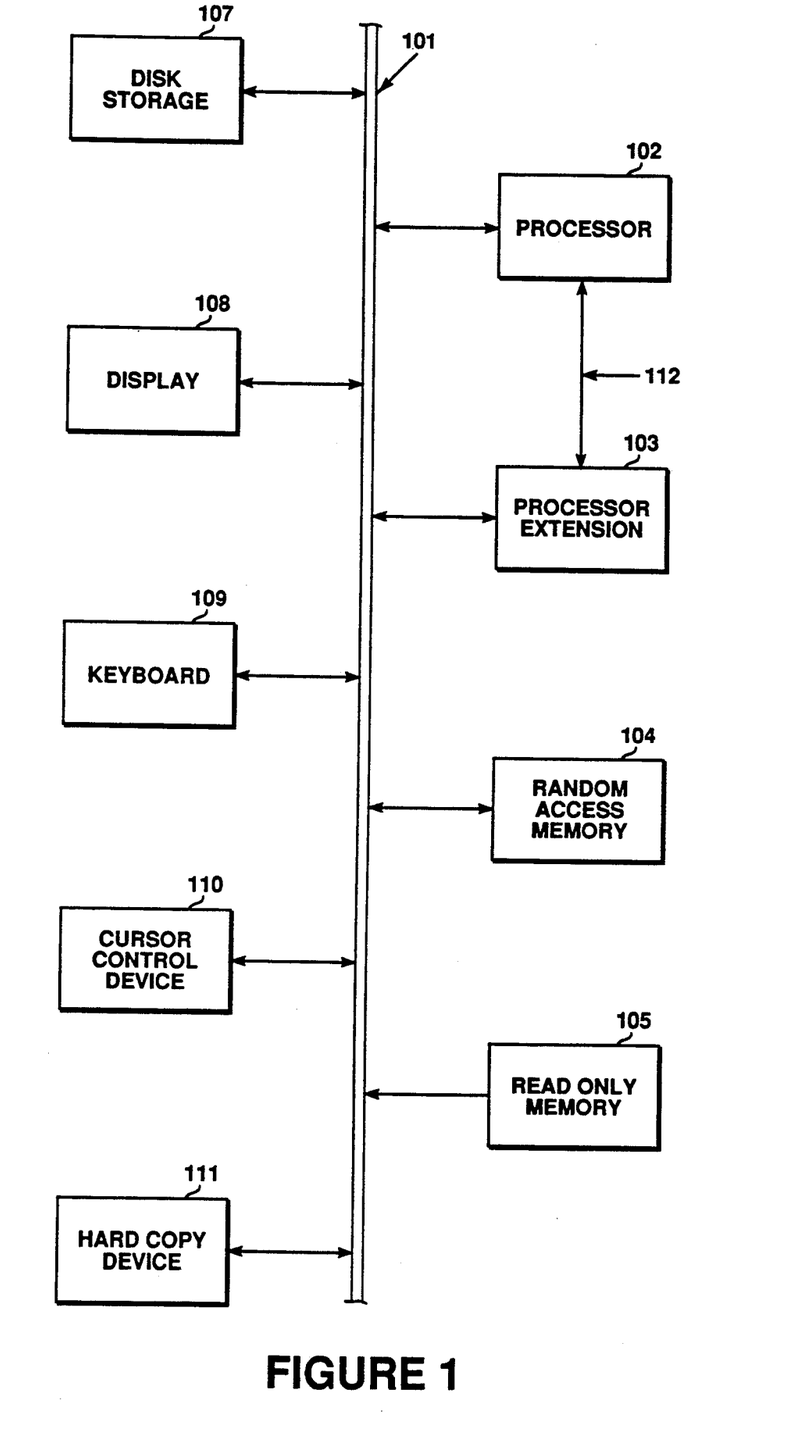
FIG. 1 is a block diagram of a computer system as embodied by the present invention.

Referring to FIG. 1, a microcomputer system as may be utilized by the preferred embodiment generally comprises a bus or other communication means 101 for communicating information between the components of the microcomputer system, a microprocessor 102 coupled with said bus 101 for processing information, a processor extension 103 e.g. a Numeric Co-processor coupled with said microprocessor 102 through control lines 112 and said system bus 101, a random access memory (RAM) or other dynamic storage device 104 coupled with said bus 101 for storing information and instructions for said microprocessor 102, a read only memory (ROM) or other static storage device 106 coupled with said bus 101 for storing static information and instructions for said microprocessor 102.

Further coupled to the bus 101 are a data storage device 107, such as a magnetic disk and disk drive for storing information and instructions, a display device 108, such as a cathode ray tube, liquid crystal display, etc., for displaying information to the computer user, an alphanumeric input device 109 including alphanumeric and other keys for communicating information and command selections to said microprocessor 102, and a cursor control device 110, such as a mouse, track ball, cursor control keys, etc, coupled to said I/O bus 106 for communicating information and command selections to said microprocessor 102 and for controlling cursor movement. Finally, it is useful, although optional in the preferred embodiment, if the system includes a hardcopy device 111, such as a printer, for providing permanent copies of information. The hard copy device 111 is also coupled to the system through bus 101.

The Intel 80286 (hereinafter the '286) family of microprocessors are designed to operate in microcomputer systems with 16-bit wide data paths. Generally, the Intel 80386 (hereinafter the '386) family of microprocessors operates in microcomputer systems with 32-bit wide data paths. The exception is the 80386SX (hereinafter the '386SX), which is designed to operate in microcomputer systems with 16-bit wide data paths. The '386SX was designed to provide the benefits of the architecture of the '386 family of microprocessors on microcomputer systems with 16-bit data paths. Specific detailed information about the '286, '287 NPX and the '386SX can be found in the publication *Microprocessors*, order No. 230483-007 available from the Intel Corporation of Santa Clara, Calif.

The preferred embodiment of the present invention is coupled to the microprocessor socket located on a motherboard of the microcomputer system, and is sometimes termed a daughterboard. Motherboard is a term commonly used to refer to a printed circuit board that is the primary system board that includes the microprocessor, processor extension, memory chips, other system support chips and bus structure.

As utilized by the preferred embodiment, the present invention enables an Intel '386SX or compatible microprocessor to replace a '286 or compatible and not require replacement of an Intel '287 or compatible NPX. In certain aspects, the present invention and the '386SX will emulate a '286 microprocessor. In other aspects, the present invention and the '287 will appear to the '386SX as an Intel 80387SX NPX.

It should be noted that in the preferred embodiment, the terms NPX and processor extension refer to the same device, i.e. the '287 or '287XL. However, it is apparent from the description that a processor extension may be something other than on NPX, e.g. a graphics accelerator or a high speed memory device.

The preferred embodiment described herein may be used as '386SX upgrade modules for existing PC/AT or compatible systems. Alternative embodiments would provide for the manufacture of new '386SX based systems utilizing PC/AT compatible motherboards. Thus, the present invention is beneficial to both existing owners of PC/AT or compatible systems and to manufacturers of PC/AT compatible systems. The present invention reduces the cost of upgrading a microcomputer system from '286 to '386 technology and allows for extending the useful life of existing IBM PC/AT and compatible systems. The present invention avoids costs when upgrading a PC/AT or compatible system, since the '287 Numeric Co-processor need not be replaced.

PACKAGING DESCRIPTION

Figure 2:
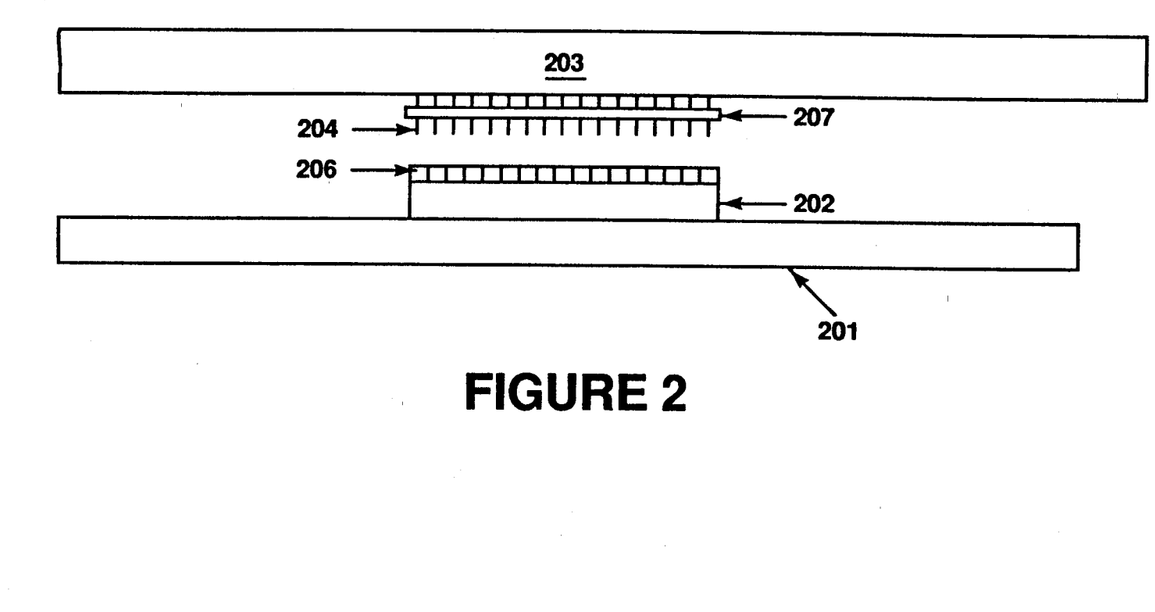
FIG. 2 is an exploded side view of an interface apparatus coupled to a microcomputer system as utilized by the present invention.

FIG. 2 is an exploded side view of the interface module of the preferred embodiment as coupled to a '286 Pin Grid Array (PGA) socket. It should first be noted that it is typical for a microprocessor to be coupled to a motherboard through a pin and socket assembly. In a pin and socket assembly, a microprocessor socket is electrically coupled to the motherboard, often through a soldering process. The microprocessor socket is comprised of a plurality of pin sockets. Electrical traces on the motherboard are coupled to each of the pin sockets. Pins coupled to the microprocessor chip and leading to the electrical circuits in the microprocessor are inserted into corresponding pin sockets of the microprocessor socket, thus creating an electrical coupling with the motherboard. A pin and socket assembly provides for easy replacement of the microprocessor in a microcomputer system.

Referring to FIG. 2 a '286 socket 202 is coupled to a motherboard 201. In the preferred embodiment the '286 socket 202 will accommodate a PGA packaged '286 microprocessor. Alternative chip packaging technologies may be utilized, e.g. Plastic Leaded Chip Carrier (PLCC) or Leadless Chip Carrier (LCC) packaging without departing from the spirit and scope of the present invention. An interface module printed circuit board (PCB) 203 coupled with pins 204 is inserted into pin slots 206 defined by the '286 socket 202. It should be noted that if alternative packaging technologies are utilized, the '286 socket would take an alternative form corresponding to that technology. In any event, the pins 204 coupled to the module 203 are aligned in a one to one correspondence with the pin sockets 206 of the '286 socket 202. A pin support 207 is positioned between the pins 204 and the socket 202. The pin support 207 is used to hold the pins 207 in alignment with the socket 202 and is constructed of plastic, although other non-conductive material e.g. fiberglass, may be utilized. The '286 chip in a PGA packaging is square in shape and defines 68 pins (e.g. the pins 204) resulting in the '286 socket having 68 pin sockets (11 of which are illustrated). The pins are arranged in a first row of 9 and a second row of 11 face each side. The total number of 68 pins results because some pins face 2 sides.

The pins 204 of the PCB 203 provide signal paths that are identical to the signals represented by the pins of a '286 chip. In other instances, the pins 204 are directly routed from corresponding pins on the '386SX. In some instances, the pins are routed from functional elements embodied by an ASIC Logic Chip (illustrated in FIG. 3). The ASIC Logic Chip win be described in more detail below. Finally, in some instances, the pins 204 are held in a steady first (on) or second (off) state. This occurs when the pin represents a signal not utilized by the 386SX but is utilized by a '286.

Figure 3:
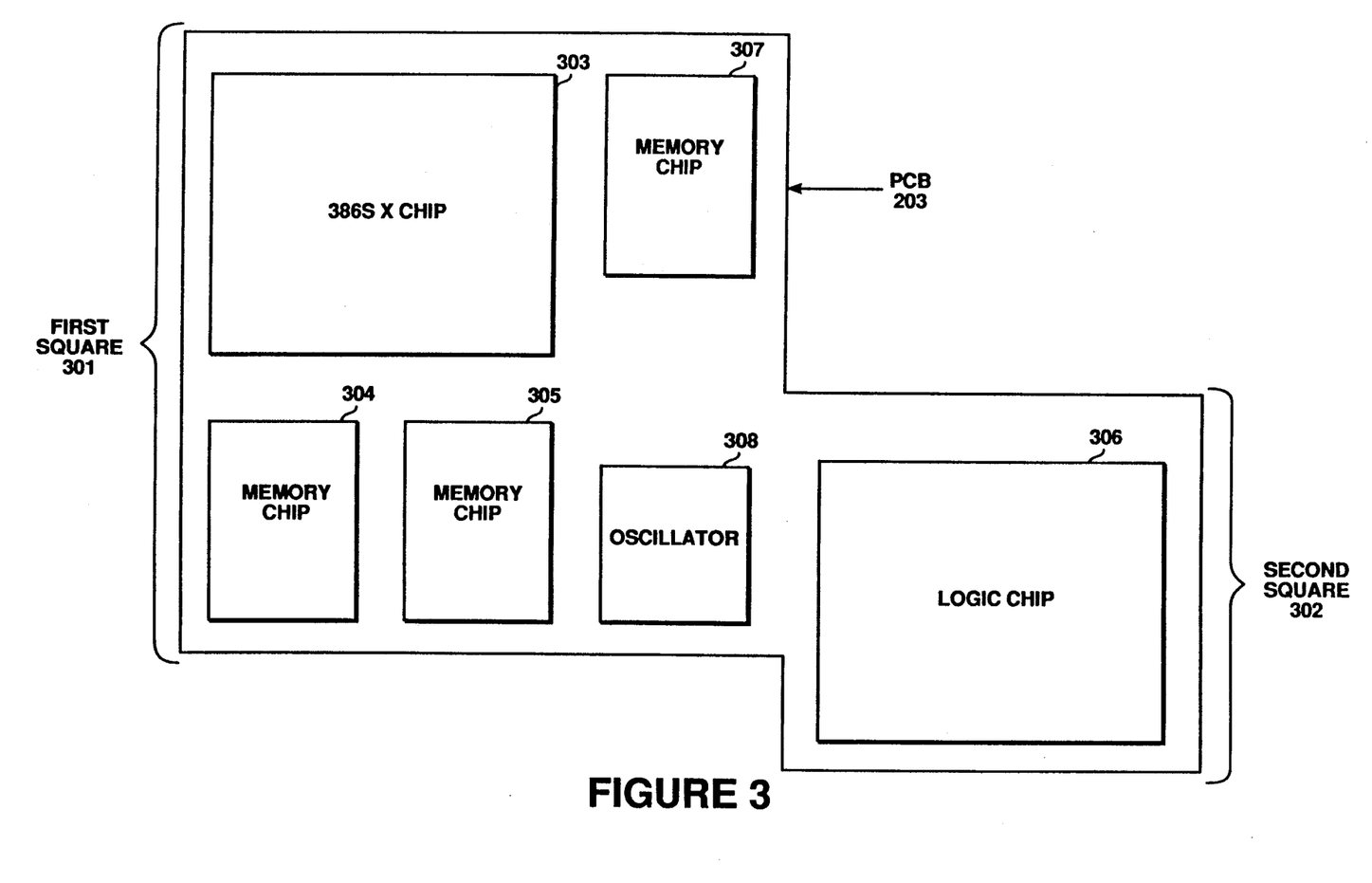
FIG. 3 illustrates in detail the interface apparatus of the present invention.

The devices that are coupled to a top side of PCB 203 are illustrated in FIG. 3. FIG. 3 is a top view of the interface module of the preferred embodiment. In the preferred embodiment, surface mount technology is utilized for the integrated circuit components. Surface mount technology mounting technologies where the integrated circuits are not coupled to the PCB through sockets, but rather they are directly coupled, usually by soldering, to the PCB. This has the advantages of reducing the number of components required on a PCB, reducing the physical height of a printed circuit board (by eliminating the socket) and reducing the potential for errors due to poor electrical connections. In any event, when the microcomputer system is a PC/AT or compatible system, the PCB 203 generally has the shape of two squares that overlap in one corner. This shape is utilized to avoid existing obstructions, e.g. a hard disk assembly, that arise due to the location of the '286 socket on the PC/AT motherboard when installed in the computer system. In the preferred embodiment, the dimensions of a first square 301 are 17/8×17/8 inches and the dimensions of a second square 302 are 15/8×15/8 inches. The overlapping sides of the square 301 are of length 11/4 inches and 11/8 inches. The overlapping sides of the square 302 is for length of 7/8 inches. It would be apparent to one skilled in the art to utilize a PCB of different shapes or dimensions, e.g. to avoid other obstructions, without departing from the spirit and scope of the present invention.

On the square 301, a '386SX chip 303, memory chips 304, 305, and 307 and an oscillator 308 are mounted. On the underside of square 301, the pins 204 (illustrated in FIG. 2) are fastened and electrically coupled to components on the PCB 203. On the square 302, a logic chip 306 is mounted. The logic chip 306 is an Application Specific (also known as ASIC) chip. An ASIC chip is a component that is designed and manufactured to perform specific functions. ASIC chip technology is well-known in the art. In the preferred embodiment, a gate array chip is utilized for logic chip 306 and Static Random Access Memories (SRAM's) are used as memory chips 304,305, and 307. It would not depart form the spirit and scope of the present invention to use other logic chips, e.g. PLA's (Programmable Logic Arrays) or Standard Cells. The Logic Chip 306 contains circuit logic which perform many of the translation and decoding functions of the preferred embodiment. In some instances, output from the Logic Chip 306 is to the pins 204. In other instances, output is to the '386SX chip 303. The same is true for inputs to the Logic Chip 306.

COMPATIBILITY

Generally, the object code that contains NPX instructions that executes on a '286 based system is compatible with a '386 based system, i.e. it will execute without changes on the '386 based system. However, the manner in which a '386SX operates and communicates with an NPX (i.e. the '387SX) is different than the manner in which a '286 operates and communicates with an NPX (i.e. a '287 or '287XL). Thus, despite the fact that the '286 based object code contains NPX instructions that will run unmodified on a microcomputer system designed specifically for the '386SX/'387SX, it may not operate correctly on a microcomputer system where the '386SX has replaced the '286 as the microprocessor or a '286/287 based computer system. The dependency is on which '287 instructions are being used, since the '386SX based system and the '286 based system will handle some NPX instructions differently.

The present invention addresses the aforementioned differences and provides for the execution of unmodified '286/'287 object code on a microcomputer system when the '286 is replaced with the '386SX. Existing application software need not be rewritten or re-compiled. This is beneficial in that it allows a user to retain their software investment in '286/'287 software. It should be noted that the '387SX instruction set contains instructions that are not defined on the '287. These instructions are documented in the aforementioned *Microprocessors* reference. Thus, such instructions would not operate on the '287 despite the interface of the preferred embodiment.

The interface module of the preferred embodiment operates asynchronously from the motherboard of the microcomputer system. Thus, the interface module operates at a different CPU clock speed than the PC/AT or PS/2 motherboard. Since a '386SX is able to operate at higher clock speeds, this provides for the microcomputer system to run at increased processing speeds, in relation to when the '286 processor was installed.

Figure 4:
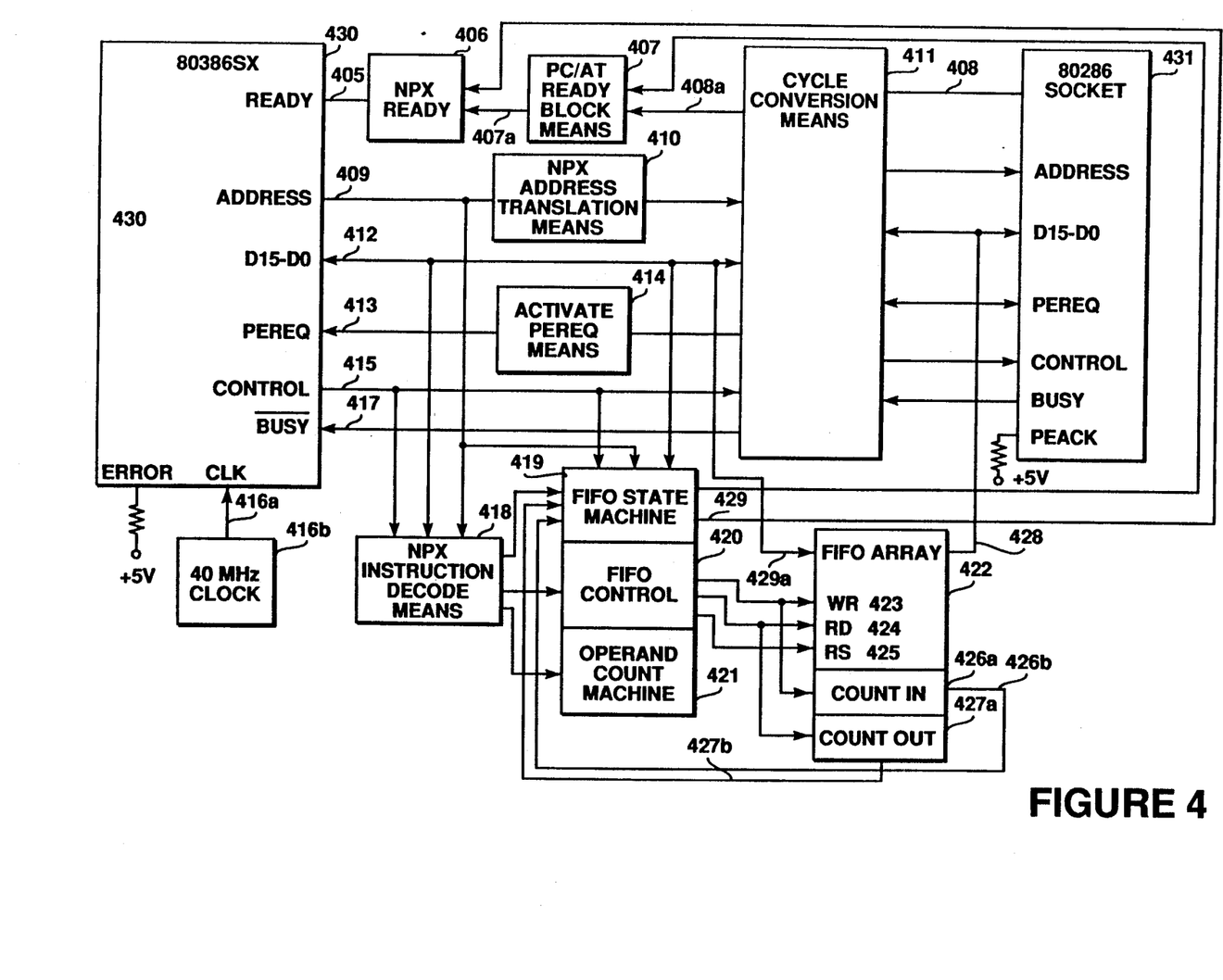
FIG. 4 is a block diagram of the processor extension interface as may be utilized by the present invention.

The interface module of the preferred embodiment provides for the handling of operational differences between the '286 and the '386SX. First, the internal Clocking Cycles between the '386SX and the PC/AT or PS/2 motherboard and the bus cycles of the 386SX and the 286, are different. Second, Processor Extension I/O Port addresses differ between the '386 and the '286. Third, the '386SX assumes that the NPX is operating with is a '387SX. The '387SX NPX allows certain instructions to be received prior to completion of a currently executing instruction. This feature is called instruction overlap. The '287 does not provide for instruction overlap. Finally, during the execution of certain instructions and upon the occurrence of an operation exception, the '386SX may enter a hang state where no instructions can be executed. Each of these operational differences will be discussed with reference to FIG. 4. FIG. 4 is a block diagram of the interface module with respect to the aforementioned operational differences.

BUS CYCLE CONVERSION

It is known that microprocessors operate at particular clock cycles (often measured in MegaHertz). Clock cycle refers to the frequency (or speed) at which an oscillator, within a microcomputer system completes a phase change cycle. Clock cycles are used to synchronize operation of the computer system. The underlying microcomputer system and peripheral components are designed in accordance with that clock cycle time. Also associated with a microcomputer system is a bus cycle. A bus cycle refers to the number of clock cycles required to perform a particular task. The '286 and the '386SX operate at different dock and bus cycle times. As shown in FIG. 4, a 40 MHz clock source 416b, is used as input to a CLK input 416a of the '386SX chip 430. Since the interface module of the preferred embodiment operates asyncronously to the PC/AT motherboard, the clock cycles of the interface module and the PC/AT motherboard need not be synchronized. It should be noted that the '386SX will internally convert the 40 MHz clock source to a 20 MHz internal clock cycle.

However, the bus cycles between '286 based PC/AT or PS/2 microcomputer system differs from that of a '386SX based microcomputer system. Thus, all signals between the '386SX chip and the PC/AT motherboard must undergo Bus Cycle Conversion. A Bus Cycle Conversion Means (BCCM) converts '386SX bus cycles to appear as '286 cycles on the motherboard. Depending on the model, the PC/AT motherboard is clocked at 6–12 MHz while the '386SX is clocked at 20 MHz. Conversion of bus cycles is accomplished through logic embodied in the logic chip 306. Techniques for converting bus cycles is known to those skilled in the art. Thus, no further discussion of how bus cycles are converted is deemed necessary. The logic chip 306 provides the appropriate signals to the PC/AT motherboard and the '386SX microprocessor during the performance of a microcomputer system task. Such appropriate signals are dependent on the task being performed. In this respect, the '386SX is being made to emulate a '286 from the PC /AT or PS/2 motherboard point of view. The appropriate signals that must be presented to the PC/AT or PS/2 motherboard sockets and the '386SX are documented in the Intel Microprocessors Data Books Volumes 1 and 2 available from the Intel Corporation.

PROCESSOR EXTENSION I/O PORT ADDRESS TRANSLATION

The '386SX sends opcodes and operands to the NPX through I/O ports located on the NPX. Since the '386SX assumes it is coupled to a '387SX, when communicating to an NPX, the '386SX automatically generates '387SX I/O bus port addresses. I/O bus port addresses differ between the '287 and the '387SX. Thus, address translation is required to correct for these differences. Table 1 shows the address translation needed for converting the '387SX address to the appropriate '287 address.

TABLE 1
I/O PORT ADDRESS TRANSLATION

| REGISTER | I/O CYCLE | 80387SX Address | 80287 Address |
|---|---|---|---|
| Command Port | write | 80000F8 | 00F8 |
| Status Port | read | 80000F8 | 00F8 |
| Operand Port | wr/rd | 80000FC | 00FA |
| Operand Port on odd word 32-bit | wr/rd | 80000FE | N/A |

Referring back to FIG. 4, address lines 409 enter an NPX Address Translation Means 410. As is apparent from Table 1, only the right most significant bits need be translated to create proper addressing. This is accomplished in the logic chip 306. In any event, after the address translation has been performed, the translated address is coupled to the Bus Cycle Conversion Means (BCCM) 411 where the '386SX address cycles are translated into PC/AT or PS/2 Motherboard address cycles and transferred to the PC.AT or PS/2 motherboard via the '286 socket.

INSTRUCTION OVERLAP HANDLING

The '386SX and '387SX have been designed so that certain NPX instructions can begin opcode (i.e. instruction) transfer to the '387SX before the '387SX has completed processing a currently executing instruction. This is referred to as instruction overlap. Instruction overlap allows the '386SX to transfer an NPX opcode, while the NPX continues processing a previously transmitted instruction. This creates improved microcomputer system performance since the task of transferring the instructions need not be deferred to the time the NPX has completed executing the prior instructions. The '287 NPX does not have the capability to support instruction overlap. In the instance an opcode is received by the '287 prior to completion of a currently executing instruction, the microcomputer system will "hang" (i.e. abnormally terminate processing). The NPX instructions which can overlap are FLD instructions with 4 or 8 byte operand sizes. FLD instructions are described in greater detail in the 80286 Programmer's Reference Manual, available from the Intel Corporation. Since the '386SX does not distinguish between a '287 and a '387SX, upon encountering an NPX instruction which may overlap a currently executing NPX instruction, the '386SX will attempt to transfer the opcode to the '287 as though it were a '387SX.

Figure 5:
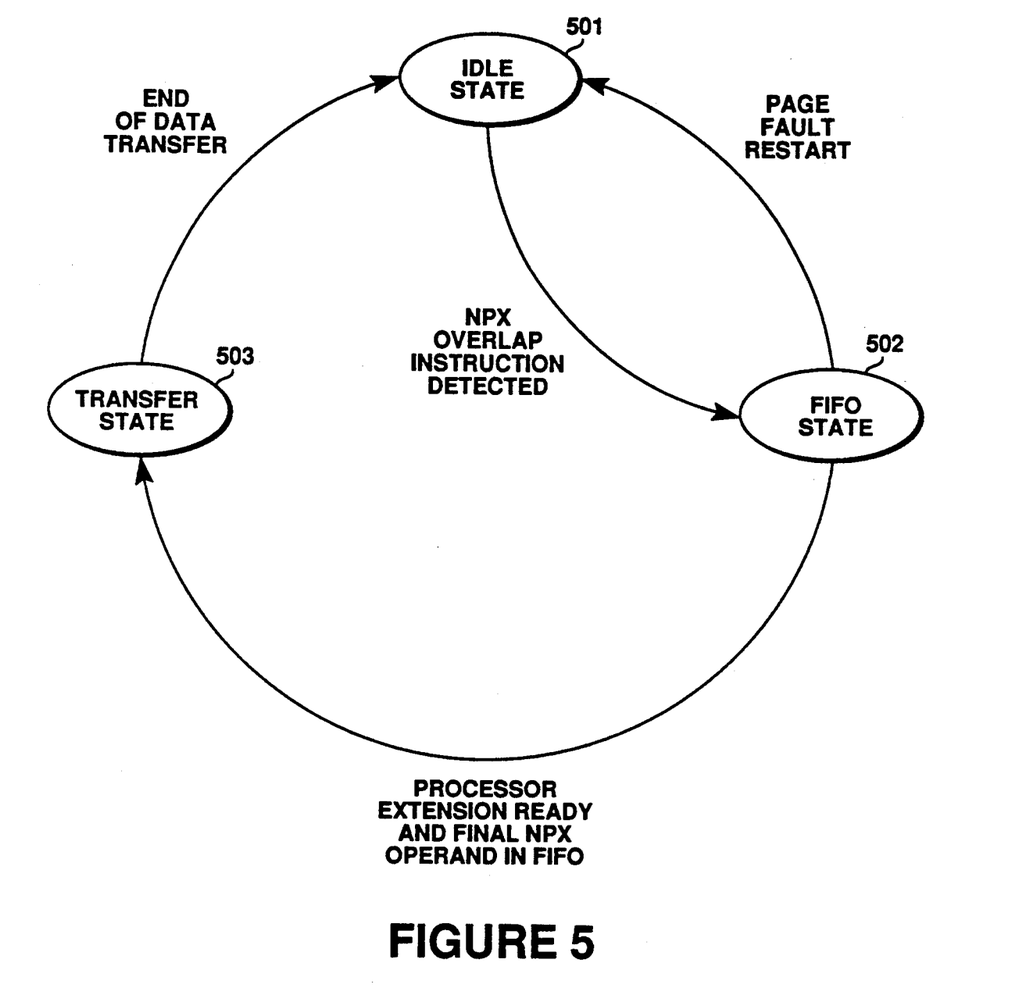
FIG. 5 is a state diagram of a FIFO machine as may be utilized by the present invention.

To prevent an overlap instruction from reaching the '287 while an instruction is being executed, a First In First Out (FIFO) queuing mechanism is utilized. FIFO queuing is a control mechanism by which elements (in this case instructions and operands) that are first placed in an array are the first ones taken out. FIFO queueing is well known in the art. FIG. 5 illustrates a state diagram of a FIFO state machine of the preferred embodiment that is used to control the queuing of overlap instructions. Such a FIFO state machine as utilized in the the preferred embodiment, is illustrated in FIG. 4 as FIFO STATE MACHINE 419. When the '386SX is executing non-overlap NPX instructions or no NPX instructions are being executed, the FIFO machine is in an idle state 501. Upon detection of an overlap NPX instruction while the '287 is currently executing an NPX instruction, a FIFO state 502, is entered. Note that both of these conditions must be met. If either one of the conditions is not met, the FIFO state 502 will not be entered. In any event, while in the FIFO state, a FIFO array is loaded with the overlap NPX opcode and the instruction operands over '386SX data lines D0-D15. When the final NPX operand has been loaded into the FIFO and the '287 has completed processing the prior instruction, the FIFO machine will enter a transfer state 503, where the contents of the FIFO are transferred to the AT motherboard for delivery to the '287. While in the transfer state 503, the READY signal to the '386SX is blocked, which effectively suspends operation of the '386SX. Upon completion of the transfer of the FIFO contents, the FIFO machine returns to the idle state 501 and the READY signal is allowed to pass to the '386SX in order to resume operation.

The FIFO state machine also provides for '386SX operation in a paged mode. Paged mode operation refers to the ability to address and manipulate data that is not contained within the RAM memory on the microcomputer system, but can be dynamically swapped into RAM memory by operating system software. Operating systems using paging are well-known in the art. In any event, an invalid condition may arise due to the '386SX handling of page faults. A page fault occurs when the '386SX requires data that is not found in the microcomputer system's RAM memory. In these instances, the data must be retrieved from an external memory source, e.g. a hard disk. When a page fault occurs on a page where an NPX opcode or operand is being read from, the '386SX will re-write the NPX opcode to the NPX. In these situations, the FIFO State Machine will detect the page fault restart by detecting an NPX opcode I/O write while the FIFO state machine is in the FIFO state 502. In order to avoid corrupting the contents of the FIFO, the controls of the FIFO will be reset, essentially flushing the FIFO, and the FIFO state machine will return to the idle state 501. At this point, the FIFO state machine may again enter the FIFO state 502 based on the re-written instruction.

OPERATION OF THE PREFERRED EMBODIMENT

Referring back to FIG. 4, FIFO state machine 419 enters a FIFO state when an NPX overlap instruction is detected by an NPX instruction decode means 418. The NPX instruction decode means of the preferred embodiment is provided by logic imbedded in logic chip 306. Such logic recognizes predetermined bit patterns as NPX instructions. The NPX instruction decode means 418 receives as input data lines 412, control lines 415 and address lines 409. The data lines 412 contain opcodes and operands. The control lines provide synchronization signals and status information.

Also illustrated in FIG. 4 are '386SX and NPX "handshaking" signals 413 and 417. The "handshaking" signals are dedicated lines of communication between the '386SX and the NPX. The "handshaking" signals utilized in the preferred embodiment include the PEREQ line 413 and the BUSY line 417. The PEREQ line 413 is used by the NPX to tell the '386SX that it is ready for another operand. The BUSY line 417 is used by the NPX to tell the '386SX that it is executing an NPX instruction, and cannot receive another instruction until the previous instruction is completed. In normal usage the NPX opcode is transferred from the '386SX to the NPX by an I/O write to address OFA (hex) when the BUSY line is inactive (i.e. in a high state). If there are any operands associated with the opcode, the 386SX will transfer these one at a time by I/O cycles (at address OFC hex) to or from the NPX when the PEREQ signal is active (in the high state). The '386SX will then provide the operands to the NPX via the data lines 412. In providing the operands to the NPX, the microprocessor may be required to perform other tasks to obtain the data, e.g. reads from registers, memory or auxiliary storage means. When the NPX has received the operands, it will begin execution and place the Busy line 417 in the active (Busy) state.

A third "handshake" signal provided by the '386SX is the ERROR line. The ERROR line is used to signal an unmasked error encountered by the NPX. The ERROR line is not utilized in PC/AT or PS/2 designs so it is pulled inactive up to logic 1 (i.e. 5 Volts) by a pull up resistor at the '386SX. It should also be noted that the '286 socket defines a slot for a PEACK signal. However, the '386SX to '387SX interface does not utilize a PEACK signal, so this line at the '286 socket is also pulled up to logic 1 by a resistor on the module.

As described above, 4 or 8 byte FLD instructions may overlap a currently executing instruction. Thus, these instructions when in an overlap condition, do not follow the general handshaking rules as described above, i.e. the Busy line 417 is not needed for transfer of the next opcode.

FIFO control means 420 is used to control the FIFO Array 422 and thus, enable the processing of overlap instructions. The FIFO control means generates write WR 423 (enabling data to be written to the FIFO Array 422 from the data lines 412), read RD 424 (allowing the contents of the FIFO Array 422 to be transferred to the AT motherboard through a line 428) and reset RS 425 (resetting counters and FIFO array pointers to zero) signals to the FIFO array 422. In the preferred embodiment, the FIFO array must be capable of storing at least five 16-bit data words. The size corresponds to the fact that overlap instructions always contain 2 or 4 word operands.

Further control mechanisms in the FIFO Array 422 are called terminal counts, here Count In 426a and Count Out 427a. The terminal counts 426a and 427a maintain counts of the number of words written into and read from the FIFO Array 422. The contents of the terminal counts 426a and 427a are provided as input to FIFO state machine 419 through lines 426b, and 427b, respectively. Data read out of the FIFO array 422 is on line 428. The data transferred on line 428 is to the PC/AT or PS/2 Motherboard database. In the preferred embodiment the line 428 is a 16 bit wide bus.

The Operand count means 421 receives the operation code for the overlap NPX instruction and determines the number of operands associated with the particular instruction, This is then used by the Count in 426a to know how may words to transfer out. In the preferred embodiment, the Operand count means is used to determine the number of operands by examining the data bits comprising the overlap operation code through logic contained within logic chip 306. Alternative schemes, e.g. table look-ups could be utilized without departing from the spirit and scope of the present invention.

In the preferred embodiment the NPX instruction decode means 418, the FIFO state machine 419, the FIFO control 420, the operand count machine 421, the FIFO Array 422, the count-in 426a and the count-out 427a are embodied within the logic chip 306. Use of other logic chips would not depart from the spirt and scope of the present invention.

As described above, the ready line 405, is used to signal completion of '386SX bus cycles. When the Ready line 405 is in an active (Ready) state, the '386SX may execute the next bus cycle. When the ready line 405 is in an inactive (Non-ready) state, the '386SX continues with its current bus cycle. In the preferred embodiment, the ready line 405, is put in an active state by either a signal from the FIFO state machine 429 or by an AT READY 408a allowing a signal 408 originating from the PC/AT motherboard to reach the '386SX. The NPX Ready 429 drives the READY line 405 into the active state when the FIFO state machine 419 is in a FIFO state, except when the last operand is being transferred to the FIFO at which time the READY line 405 is kept in an inactive state. Then when the FIFO state machine 419 moves into the transfer state, the PC/AT Ready Block 407 blocks the PC/AT motherboard from generating a Ready signal 408 to the '386SX until all NPX operands from the FIFO Array 412 are transferred to the PC/AT motherboard, at which time the PC/AT motherboard READY may drive READY line 405, to the active state.

Viewed in conjunction with the states of the present invention, referring to FIG. 5 when the FIFO machine is in the FIFO state 502 logic will provide READY 406 to the 386SX for the NPX opcode and each NPX operand stored in the FIFO except the last operand. When the FIFO machine then moves into the TRANSFER state 503, AT Ready block 407 will prevent AT motherboard READY 408 from reaching the '386SX. This prevents the '386SX from executing further instructions or responding to Interrupts or Hold requests until the opcode and operands are all transferred to the AT motherboard. This also keeps the 386SX address bus at the operand address 80000FX (hex). When the FIFO state machine moves from the TRANSFER state 503 back to the IDLE state 501 the FIFO STATE MACHINE 419 will remove AT Ready block 407 and the AT motherboard READY will generate the '386SX READY signal 429 so the '386SX can then continue normal operation.

The address translation as described above denotes which I/O port on the NPX that the instruction or operands must be sent. The address translation during a FIFO transfer occurs as follows. As the transfer state is entered and 386SX READY is blocked, the operand address (800000FA) is maintained by the 386SX. This in turn is translated to the address 80000FC. But since the first element out of the FIFO is the NPX opcode, the address translation converts the operand port address 80000FC into the command port address 80000F8 (which is simply a matter of converting the second least significant bit from a 1 to a 0 value). Subsequent FIFO elements are NPX operands so the normal '387 to '287 operand address conversion is restored changing the 80000FA still at the '386SX to 80000FC on the PC/AT address bus (this is simply a matter of converting the three least significant bits to the binary value 010).

PROCESSING OVERLAG INSTRUCTIONS CONDITIONS

Figure 6A:
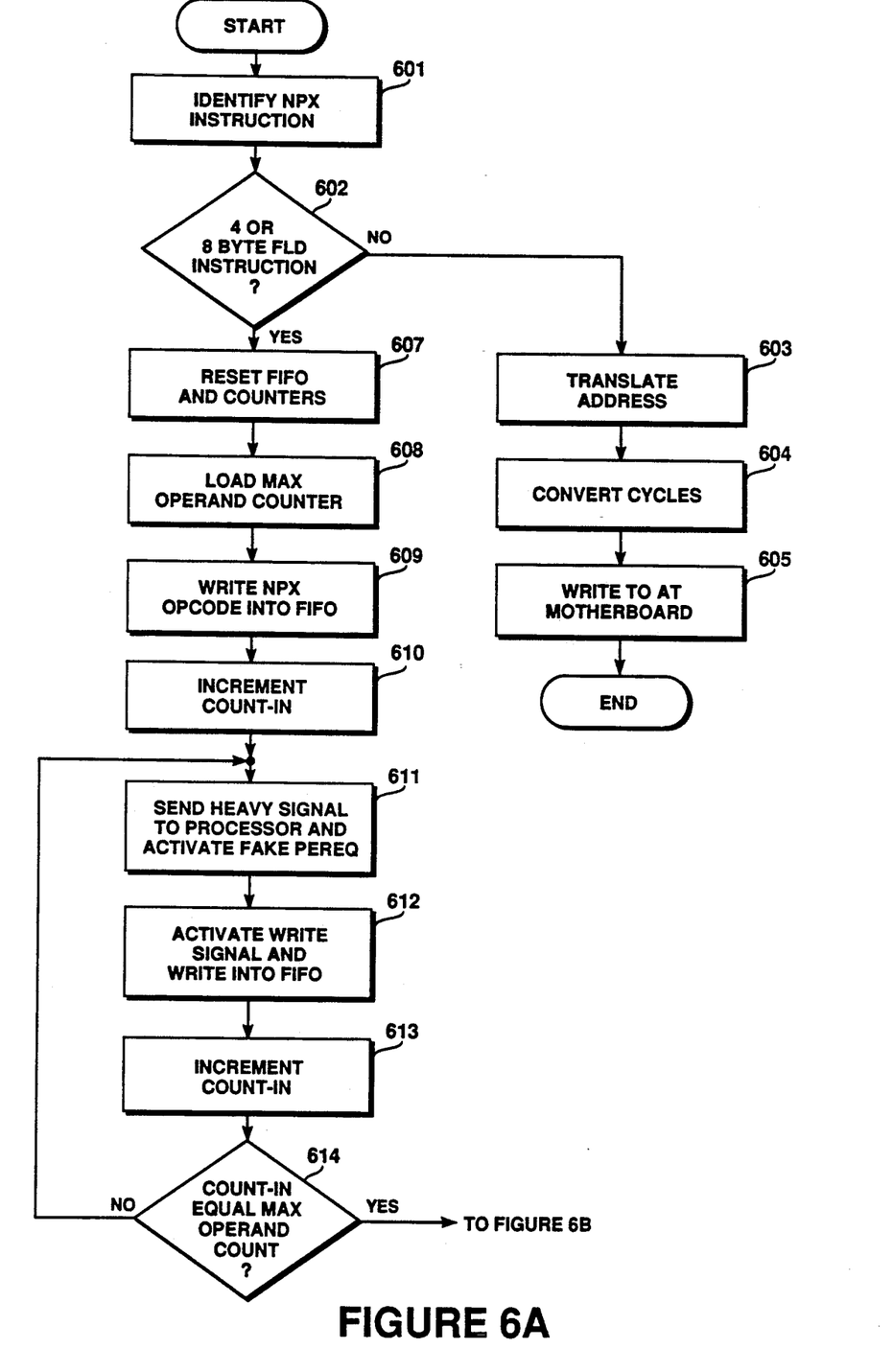
FIGS. 6A and 6B are flowchart outlining the process and method of the FIFO state machine as may be utilized by the present invention.
Figure 6B:
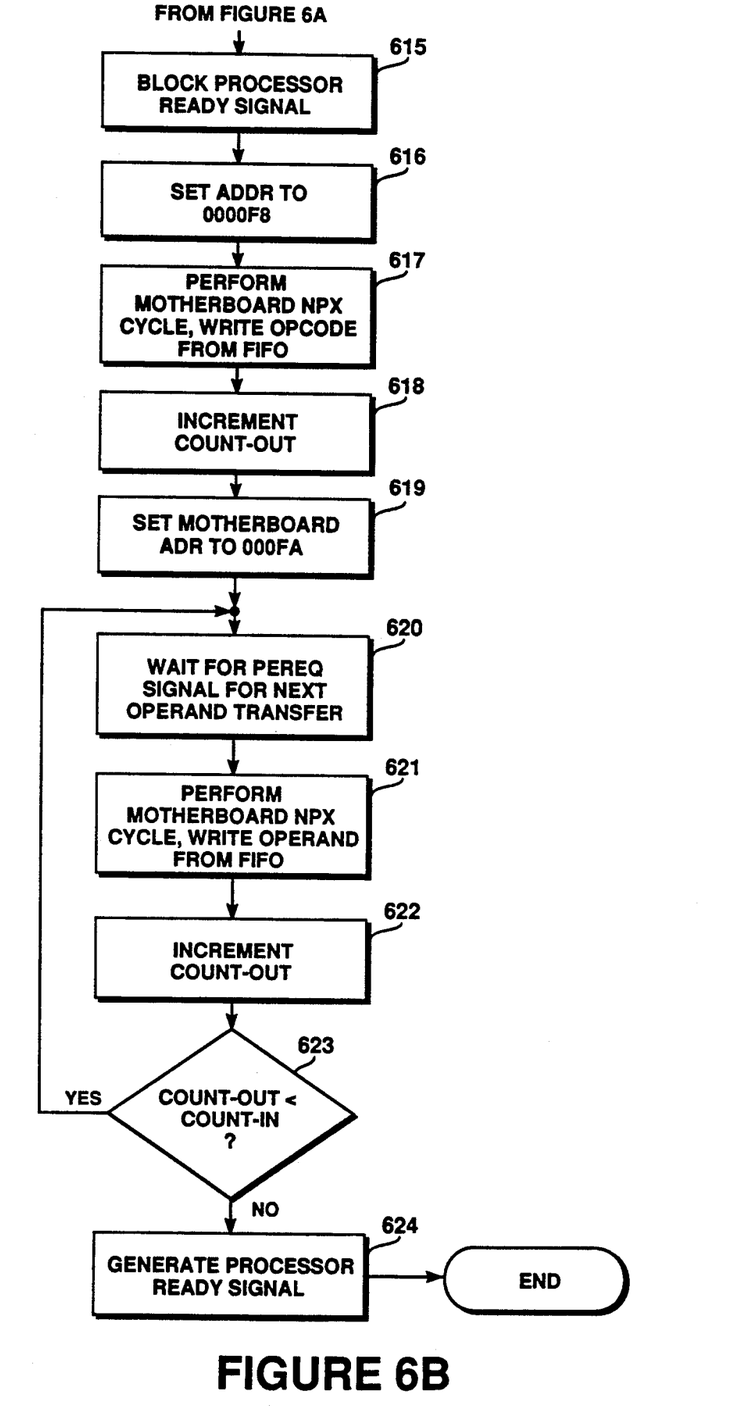

The processing of NPX instructions in an overlap condition is illustrated in FIGS. 6A and 6B. Assuming that the FIFO state machine is in the idle state, it must first be determined whether an NPX instruction has been issued, step 601. NPX instructions are detected by decoding the '386SX address and control lines. It is then determined if the NPX instruction is an FLD 4 or 8 byte instruction, step 602. If not, it is then immediately translated to a '287 address, step 603. The '386 and '286 cycle conversion occurs, step 604 and the instruction is written to the AT motherboard, step 604.

Assuming that the NPX instruction is a 4 or 8 byte FLD, an instruction FIFOing process is invoked. At this point, the FIFO state machine enters the FIFO state. First, the instruction FIFO and accompanying control logic are reset and initialized to a predetermined start state, step 607. This is accomplished by the invocation of a FIFO Reset signal that is coupled to FIFO control counters. The NPX instruction is then decoded by the operand count machine 421 where the number of operands for the instructions is determined. The number of operands is loaded into a maxcount operand counter, step 608. Next, the NPX opcode ('386SX data D0-D15) will be loaded into the FIFO array, step 609 and the count-in 426 of the FIFO array 422 is incremented by 1, step 610. The instruction is written into the FIFO Array 412 by a FIFO write signal 423 being activated whereby the contents of the data lines 412 are written into the FIFO Array 422 and blocked from the AT motherboard.

After the opcode has been loaded into the FIFO, a fake PEREQ signal is sent from activate PEREQ means 414 to the '386SX in order for the operands of the opcodes to be transferred onto the data lines, step 611. When each subsequent operand write occurs, the write enable signal is activated and the operand is written into the FIFO, step 612. The count-in is then incremented by 1, step 613, to reflect an operand being inserted into the FIFO. The operand count is then compared to the maxcount operand counter, step 614. If the operand count does not equal the maxcount the PEREQ is still activated by activate PEREQ means 414 and more operands are FIFOed to the FIFO array 422. When the FIFO state machine 419 moves to the transfer state, then 1) the operand count does equal the maxcount operand and 2) PC/AT Ready is blocked, step 616a.

READY to the 386SX is blocked during the transfer state in order to prevent bus operations by the processor that could create undesired results. The PC/AT Ready Block 407 blocks the PC/AT Ready signal by gate logic contained within logic chip 306. Next, the address on the address lines is set to 0000F8 step 616b. The NPX opcode is then written immediately to the PC/AT motherboard, step 617. The NPX element that will be sent first is the opcode of the instruction to be executed. Further, the count-out of FIFO Array 422 is incremented by 1, step 618.

Next, the NPX operands will be transferred to the PC/AT motherboard for transfer to the NPX. First, the PC/AT I/O port address is changed to 0000FA, step 619. The transfer of operands will only occur when the PEREQ signal from the motherboard is active. Thus, a wait state is entered until PEREQ signal is received from the '287, step 620. When PEREQ is active, a Read signal 424 is generated by the FIFO control 420 to the FIFO Array 422 and an operand is written to the PC/AT motherboard, step 621. Further the count-out 427 is incremented by 1, step 622. Next, the count-out 427 is compared to the count-in 426, step 623.

If the count-out 427 is less than the count-in 426 then the process is repeated at step 620, i.e. wait for PEREQ to generate a ready signal. If the count-out 427 is greater than or equal to the count-in 426, then reads from the FIFO Array 422 are completed and the PC/AT motherboard Ready signal can be let through to the the '386SX, step 624, thus completing the NPX overlap instruction processing.

As noted above, during the processing of an overlap instruction, the '386SX may suffer a page fault when in a paged mode operation. Page faults are detected in the preferred embodiment by the detection of a new NPX opcode write while the FIFO state machine is in the FIFO state. The detection of a new NPX opcode write is detected by the NPX instruction decode means 418.

The preferred embodiment detects page faults and then processes them by resetting the FIFO state machine controls and putting the FIFO machine in the idle state. This is accomplished by logic embodied by logic chip 306. Effectively, this will require a re-execution of the NPX instruction that was executing when the page fault occurred. When the NPX instruction is re-executed, the FIFO state machine may be again invoked if the '287 is still processing the prior instruction. If the '287 has completed processing the prior instruction, then no the FIFOing process need not be invoked.

FSTR INSTRUCTION EXCEPTION HANDLING

In the event of an error during the execution of an instruction, the '287 activates the ERROR signal for exception reporting. However, some system implementations, e.g. ones utilizing IBM PC/AT and compatible motherboard circuitry, do not utilize this ERROR signal. Because of this, it is known that NPX FSTR instructions that generate an exception in the middle of NPX operand transfers can cause the '386SX to enter a "hang" condition. A "hang" condition refers to a state where the processor is unable to continue processing without some manual intervention, e.g. a restarting of the '386SX processor.

The hang condition is created because the '386SX expects activation of the PEREQ line when the exception occurs. A '387SX NPX would thus, activate the PEREQ line. The '287 does not activate the PEREQ line in these situations because the '286 does not need to complete transfer of the operands in order to service the exception, but the '386SX does.

Referring back to FIG. 4, the PEREQ signal is interfaced with an activate PEREQ Means 414. The activate PEREQ Means 414 detects a '386SX hang condition resulting in an operation exception occurring while the '386SX is transferring operands to the FIFO Array 422. A hang condition is detected by determining a lack of processor activity over a predetermined period of time. In the preferred embodiment, a recurring signal, in this case a HOLD signal generated from a device such as a Direct Memory Access (DMA) device, is used as a counting source. Processor activity is detected by monitoring data bus activity. Thus, a hang condition is detected if no data bus activity is detected over a predetermined number of HOLD signals. In the preferred embodiment, the predetermined number of HOLD signals approximates one millisecond.

When a hang condition is detected the Activate PEREQ Means 414 activates the PEREQ signal 414. The activation of PEREQ signal 413 allows the 386SX to continue transferring operands and then to service the operation exception.

Thus, a method and apparatus that provides for the replacement of a microprocessor in a microcomputer system is disclosed.

I claim:

1. An interface device for the replacement of an original microprocessor with a replacement microprocessor in a microcomputer system, said original microprocessor and said replacement microprocessor having different operating characteristics, said original microprocessor coupled to said microcomputer via a socket, said microcomputer system having means for coupling said original microprocessor with a Numerical Processor Extension (NPX), said interface device comprising:
said replacement microprocessor;
a bus cycle conversion means coupled to said replacement microprocessor, said bus cycle conversion means for converting a first bus cycle type associated with said replacement microprocessor to a second bus cycle type associated with said microcomputer system;
NPX instruction detection means coupled to said replacement microprocessor, said NPX instruction detection means for detecting an NPX instruction provided by said replacement microprocessor;
queuing means coupled to said replacement microprocessor, said queuing means for storing NPX instruction and operands provided by said replacement microprocessor prior to transfer to said NPX;
address translation means coupled to said replacement microprocessor for converting an address associated with said replacement microprocessor to an address associated with said original microprocessor and said NPX; and
coupling means for coupling said interface device with said socket vacated by said original microprocessor.

2. The interface device as recited in claim 1 wherein said original microprocessor is an Intel 80286 or compatible device and said replacement microprocessor is an Intel 80386SX or compatible device.

3. The interface device as recited in claim 2 wherein said coupling means is comprised of electrically conductive pins defined by said interface device.

4. The interface device as recited in claim 3 wherein said instruction detection means is further comprised of an instruction decode means for decoding the instruction and means for determining that the instruction is an overlap instruction.

5. The interface device as recited in claim 4 wherein said microcomputer system is an IBM PC/AT or compatible system.

6. The interface device as recited in claim 4 wherein said microcomputer system is an IBM PS/2 or compatible system.

7. In a microcomputer system said microcomputer system including an original microprocessor coupled with a Numerical Processor Extension (NPX) said original microprocessor coupled to said microcomputer system through a socket on a motherboard, a module for replacing said original microprocessor comprising:
coupling means for coupling said module to said socket vacated by said original microprocessor on said motherboard;
a replacement microprocessor, said replacement microprocessor having different operating characteristics than said original microprocessor;
a bus cycle conversion means coupled to said replacement microprocessor and said coupling means, said bus cycle conversion means for converting a first bus cycle type cycle associated with said replacement microprocessor to a second bus cycle type cycle associated with said original microprocessor; and
NPX interface means coupled to said replacement microprocessor and said coupling means, said NPX interface means for controlling the communication between said replacement microprocessor and said NPX.

8. The module as recited in claim 7 wherein said replacement microprocessor will transfer any one of a predetermined set of instruction to said NPX, prior to said NPX completing execution of a currently executing instruction.

9. The module as recited in claim 8 wherein said NPX interface means is comprised of:
instruction detection means for detecting means for detecting an NPX instruction has been issued by said replacement microprocessor; and
instruction queuing means for queuing NPX instructions and operands that have been transferred by said replacement microprocessor.

10. The module as recited in claim 9 wherein said instruction queuing means is comprised of:
a first memory means for storing NPX instructions and operands;
a queuing control means coupled to said first memory means; said queuing control means for controlling the writing to said first memory means and the reading from said first memory means;
a first transfer enabling means for enabling transfer of information from said replacement microprocessor to said motherboard;
a first disabling means for disabling transfer of information from said replacement microprocessor to said motherboard;
a second disabling means for preventing the transfer of information sent by said replacement microprocessor from reaching said motherboard;
a second transfer enabling means for enabling the transfer of information from said first memory means to said motherboard; and
operating exception handling means.

11. The module as recited in claim 10 wherein said original microprocessor is an Intel 80286 or compatible device, said replacement microprocessor is an Intel 80386SX or compatible device and said NPX is an Intel 80286 or compatible device.

12. In a microcomputer system, said microcomputer system comprising a microprocessor, a Numerical Processor Extension (NPX), and a first memory means, said microprocessor being coupled to said NPX and said first memory means, said microprocessor issuing a plurality of NPX instructions, an overlapping subset of said plurality of NPX instructions being NPX instructions that may be issued while a first NPX instruction is being executed by said NPX, a method for sequential delivery to said NPX of overlapping instructions sent by said microprocessor comprising the steps of:
  determining that a second NPX instruction has been issued by said microprocessor;
  determining that said second NPX instruction is in said overlapping subset;
  determining that said NPX is busy executing said first NPX instruction;
  blocking transfer of information from said microprocessor to said NPX;
  writing said blocked transferred information to said first memory means;
  determining that the NPX is not busy; and
  transferring said blocked transferred information from said first memory means to said NPX.

13. The method as recited in claim 12 wherein said first memory means is a First In First Out queue.

14. The method as recited in claim 13 wherein said microprocessor is an Intel 80386SX or compatible device and said NPX is an Intel 80287 or compatible device 15. The method as recited in claim 13 wherein said microprocessor is an Intel 80286SX or compatible device and said NPX is an Intel 80287XL or compatible device.

16. A computer system comprising:
  a motherboard having a socket, the socket configured to accept an original processor, the original processor operating according to a first set of operating characteristics;
  a Numerical Processor Extension (NPX) coupled to the motherboard, the NPX being capable of executing only one NPX instruction at a time;
  a processor module coupled to the motherboard via the socket, the processor module further including:
    a replacement processor operating according to a second set of operating characteristics different from the first set of operating characteristics;
    bus cycle conversion circuitry coupled to the replacement processor, the bus cycle conversion circuitry converting a signal of a first bus cycle type associated with said replacement processor to a signal of a second bus cycle type associated with the original processor; and
    NPX interface circuitry coupled to the replacement processor, the NPX interface circuitry controlling communication between the replacement processor and the NPX, the NPX interface circuitry delivering NPX instructions to the NPX sequentially.

17. The computer system according to claim 16, wherein the replacement processor is capable of issuing a second NPX instruction to the NPX while the NPX is currently executing a first NPX instruction, the second NPX instruction being issued by the replacement processor if the second NPX instruction is one of an overlapping subset of NPX instructions that may be transferred while the NPX is executing another NPX instruction.

18. The computer system according to claim 17, wherein the NPX interface circuitry further comprises:
  instruction detection circuitry, the instruction detection circuitry detecting issuance of the second NPX instruction that has been issued by the replacement processor; and
  instruction queuing circuitry, the instruction queuing circuitry queuing the second NPX instruction.

19. The computer system according to claim 18, wherein the instruction queuing circuitry further includes:
  a first memory for storing the second NPX instruction;
  queue control circuitry coupled to the first memory, the queue control circuitry controlling write and read accesses to the first memory;
  first enabling means for enabling transfer of information from the replacement processor to the motherboard;
  first disabling means for disabling transfer of information from the replacement processor to the motherboard;
  second disabling means for preventing transfer of information sent by the replacement processor from reaching the motherboard;
  second enabling means for enabling transfer of information from the first memory to the motherboard; and
  operation exception handling means.

20. The computer system according to claim 19 wherein the original processor as in Intel 80286 or compatible device, the replacement processor is an Intel 80386SC, and the NPX is an Intel 80287 or compatible device.

* * * * *